United States Patent [19]

Yamamura et al.

[11] 4,428,001
[45] Jan. 24, 1984

[54] EDITING CONTROL APPARATUS FOR VIDEO TAPE RECORDERS

[75] Inventors: Kazumasa Yamamura; Mamoru Ishiguro, both of Atsugi, Japan

[73] Assignee: Sony Corporation, Tokyo, Japan

[21] Appl. No.: 307,953

[22] Filed: Oct. 2, 1981

[30] Foreign Application Priority Data

Oct. 9, 1980 [JP] Japan ................................ 55-141265
Oct. 9, 1980 [JP] Japan ................................ 55-141266

[51] Int. Cl.³ ........................ A04N 5/76; G11B 27/02
[52] U.S. Cl. ................................. 358/335; 360/14.1; 360/74.1
[58] Field of Search .............. 358/335, 311; 360/14.1, 360/14.2, 31, 72.2, 74.1, 33.1, 74.4

[56] References Cited

U.S. PATENT DOCUMENTS 4,115,819 9/1978 Shigeta ........................... 360/14.1
4,308,563 12/1981 Gohda ............................. 360/14.2

Primary Examiner—Alan Faber
Attorney, Agent, or Firm—Hill, Van Santen, Steadman & Simpson

[57] ABSTRACT

An editing controller for video tape recorders has a return/jump key which enables an operator to check and quickly correct continuities of two takes for video images. The return/jump key functions to return the tape position to a cut-in point during preview operation, and to jump the tape position towards a cut-out during review operation.

5 Claims, 8 Drawing Figures

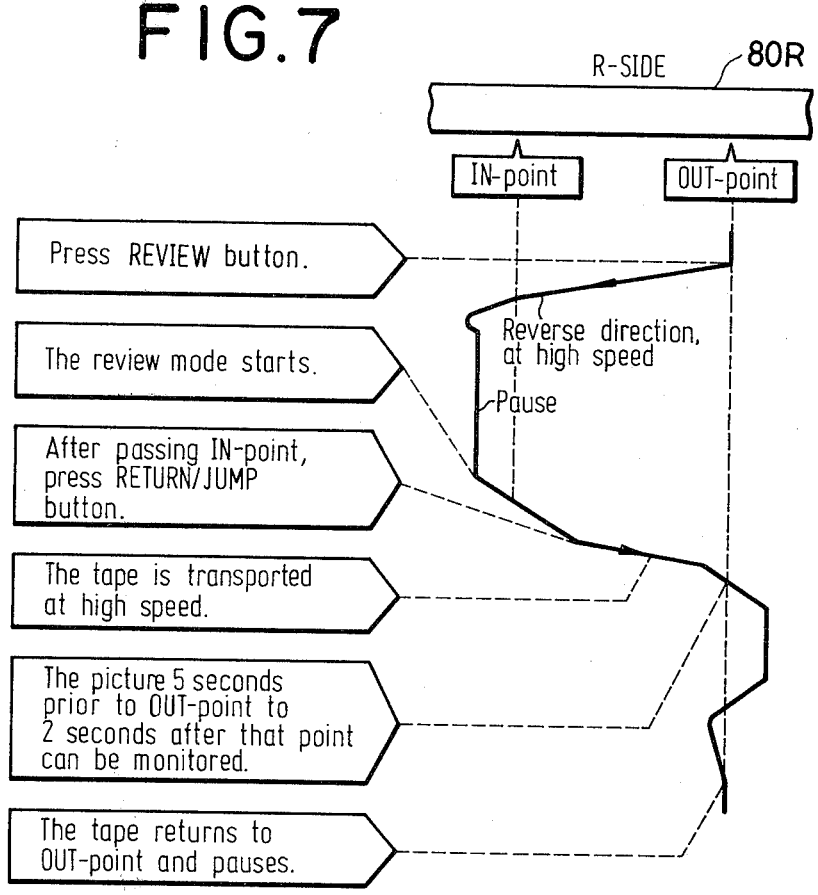

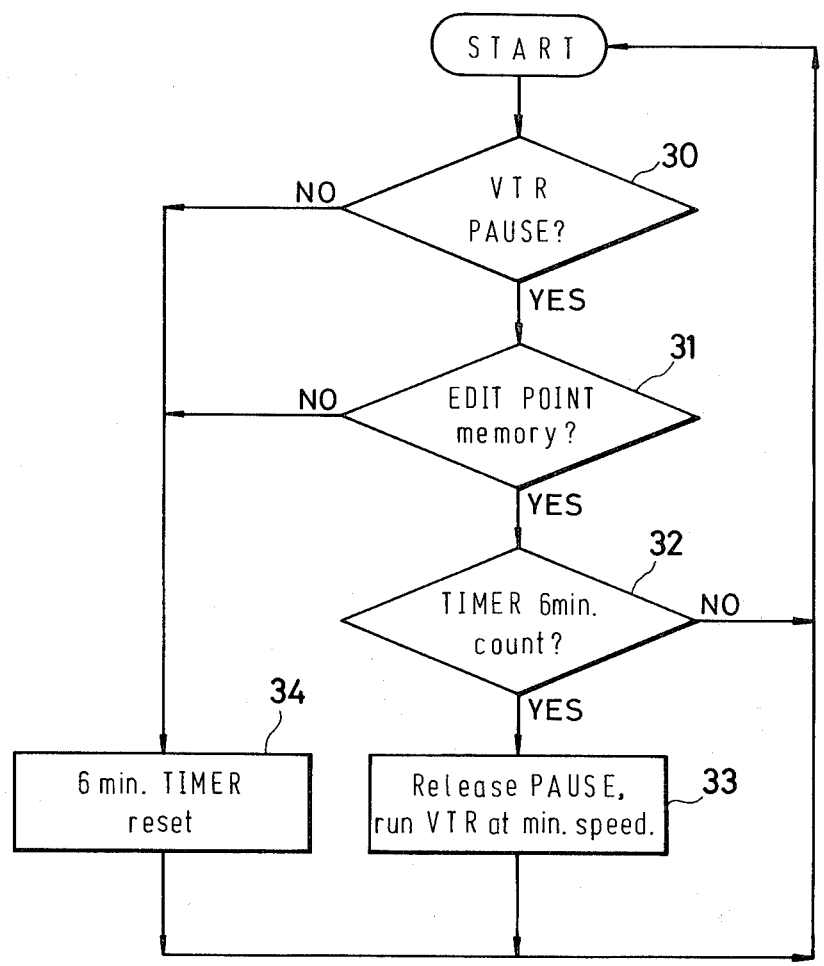

EDITING CONTROL APPARATUS FOR VIDEO TAPE RECORDERS

BACKGROUND OF THE INVENTION

1. Field of the Invention

This invention relates to a system control apparatus for video tape recorders, and particularly to such a system control apparatus which controls a pair of video tape recorders for electronic editing purposes.

2. Description of the Prior Art

Recently, it is very common to create a programmed video tape by applying an electronic editing to a number of original takes of video tapes.

As is well-known, an editing controller and at least a pair of video tape recorders are necessary to carry out the video tape editing.

Normally, the editing controller includes a micro processor, and the editing operation is managed by an editing program written in a read only memory.

Needles to say, the most important point of the editing operating is the continuity of the edited image at cut-in and cut-out points on the programmed video tape.

For the purpose of editing rehearsals, the editing controller functions to pre-view the programmed image before actual editing operation.

In the conventional editing controller, when a cut-in point is required to be changed during preview operation, several button operations were required in order to rewind the tape and access to the cut-in point.

Editing point decisions are a very critical operation. Such operations are frequently repeated two or three times for deciding one cut-in point.

Furthermore, in the conventional editing controller, after the cut-in point is determined, several button operations are required to check the cut-out point.

In normal video tape editing, several tens of editing points should be determined even for a video take having a play time of ten minutes. It is desired for the editing controller that the number of button operations is decreased as much as possible.

SUMMARY OF THE INVENTION

An object of this invention is to provide a novel video tape editing controller.

Another object of this invention is to provide a novel video tape editing controller with a novel function key.

A further object of this invention is to provide a novel video tape editing controller in which access to a particular tape position to check an editing condition or to change an editing point can be performed by a simple key operation.

A tape controller according to this invention includes a key named as "jump/return". The key functions as a return function key when depressed during preview, and it functions as a jump function key during review. When an operator finds the continuity of edited video image unnatural before and after the cut-in point during preview, the operator depresses the key to rewind the tape to the cut-in point and stop it there. When the operator depresses the key during review, the tape is jumped at high speed to a position, for example five seconds before the cut-out point, and then the tape is played back at the normal speed toward the cut-out point, so that the continuity of video image before and after the cut-out point can be checked.

In accordance with an aspect of this invention, an editing control apparatus for video tape recorders, includes: (A) means for sensing positions of video tapes installed in a recorder-VTR and a player-VTR, respectively; (B) means for memorizing data for positions of the video tapes obtained at the position sensing means; (C) means for advancing video tapes of the recorder and player VTRs in synchronism to each other with reference to the memorized data for respective video tapes; (D) means for interrupting the video tape advancing operation by manually operating switching means; and (E) means for positioning respective video tapes to positions referenced by memorized data in the data memorizing means immediately after the interrupting means is actuated.

Other objects, features and advantages according to the present invention will become apparent during the course of the description which follows.

BRIEF DESCRIPTION OF THE DRAWINGS

FIG. 7 is a view for explaining a jump function in the apparatus of FIG. 1, and showing the relationship between time and tape position; and FIG. 8 is a flow chart for explaining an operation for performing a minimum speed run after a long time stop.

DESCRIPTION OF THE PREFERRED EMBODIMENTS

Figure 1:
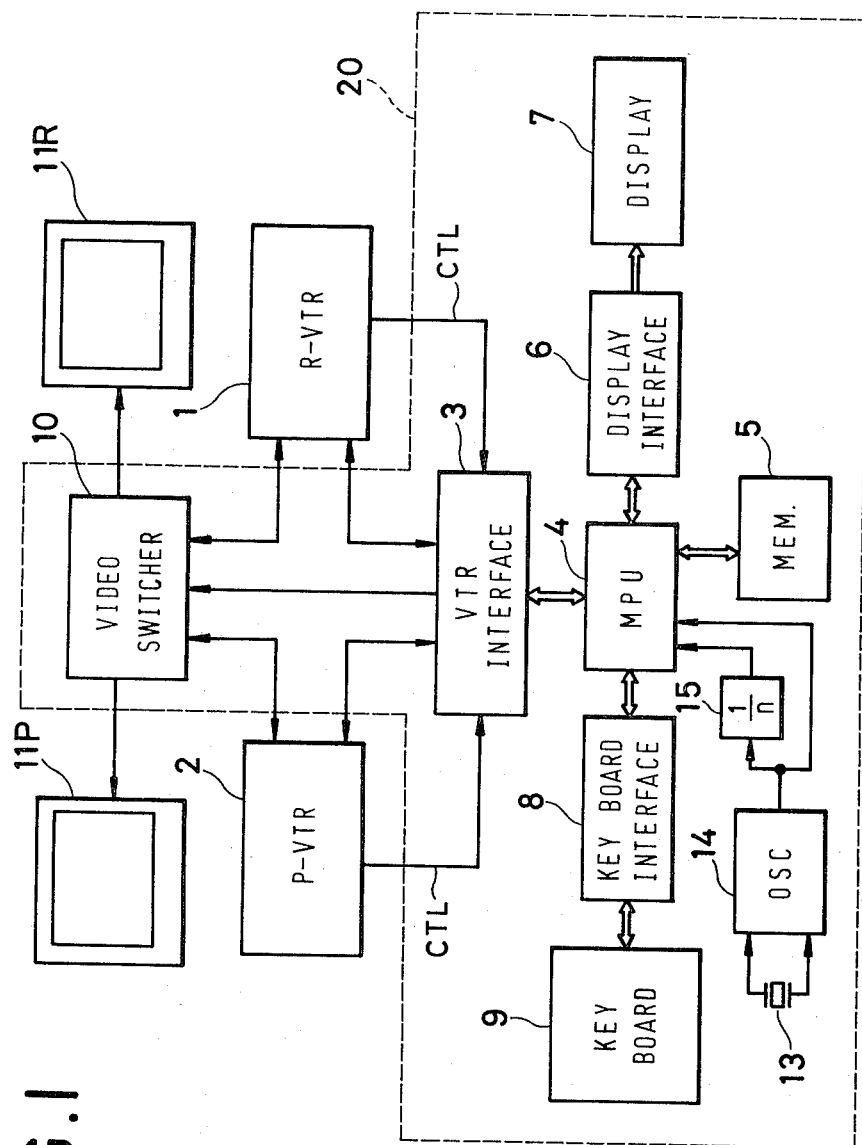
FIG. 1 is a basic block diagram of an editing control apparatus for video tape recorders according to an embodiment of this invention.

A basic construction of an editing control apparatus for video tape recorders according to one embodiment of this invention is shown in FIG. 1. In FIG. 1, a reference numeral 1 denotes a record-side VTR (R-VTR), and a reference numeral 2 denotes a playback-side VTR (P-VTR).

The VTRs are connected through a VTR interface 3 to a micro processor unit (MPU) 4. A memory 5, which includes registers, counters, etc., is necessary for editing and performing the editing program. Accordingly, the memory 5 includes a read-only memory (ROM) containing the editing program, and a random access memory (RAM) required for performing the program. A numeric display 7 is connected through a display interface 6 to the MPU 4. Furthermore, a key board 9 is connected through a key board interface 8 to the MPU 4.

The VTR interface 3 gives operation commands to the VTRs 1 and 2, and receives operation status signals and reproduced CTL pulse signals from the VTRs 1 and 2. The VTRs 1 and 2 are connected to a video switcher 10 which is in turn connected to monitors 11R and 11P.

Control signals are supplied to the video switcher 10 from the VTR interface 3. Clock signals from an oscillator 14, including a crystal oscillator, are supplied to the MPU 4. The clock signals are also supplied to a frequency divider 15. Interrupting clock signals from the frequency divider 15 are supplied to the MPU 4.

In actual construction, an editing control apparatus 20 indicated by a dashed line is contained in one cabinet. An operating panel of the editing control apparatus 20 is shown in FIG. 2.

Figure 2:
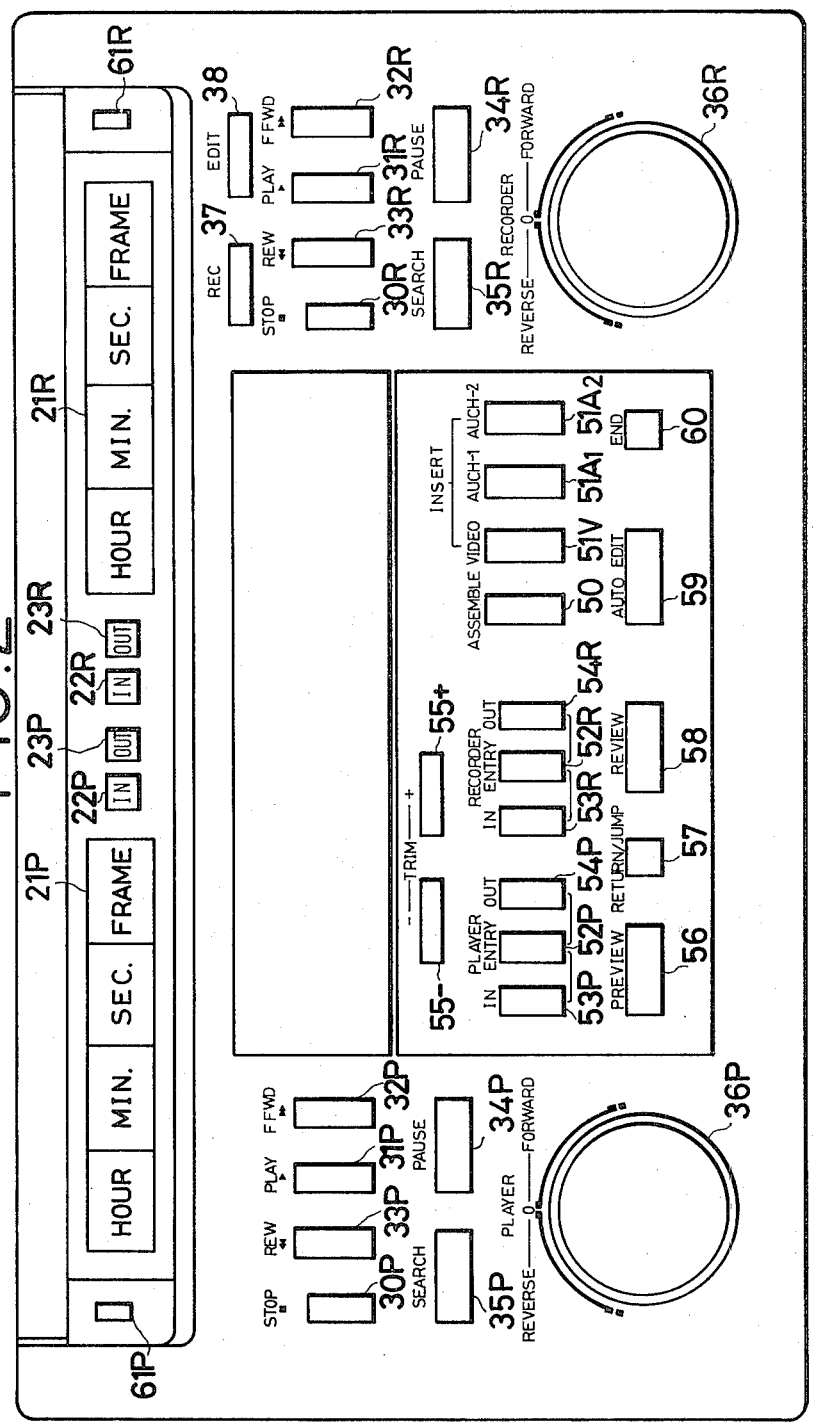
FIG. 2 is a plan view of an operating panel of the apparatus of FIG. 1.

In FIG. 2, reference numerals 21R and 21P represent timer displays for the R-VTR 1 and P-VTR 2, respectively. They display time in hour, minute, second and frame on the basis of the CTL pulses. Memory entry displays 22R, 23R, 22P and 23P are aligned with the timer displays 21R and 21P. In an operating part corresponding to the key board 9 of FIG. 1, function buttons for remote control and editing control are arranged. The function buttons for remote control are provided in the R-VTR 1 and P-VTR 2, respectively. The function buttons for the R-VTR 1 will be here described. The function buttons for the P-VTR 2 are denoted by the suffix P, the description of which will be omitted.

There are arranged a stop button 30R, a play button 31R, a fast forward button 32R, a rewind button 33R, and a pause button 34R as the function buttons. A search dial 36R is further provided for arbitrarily changing tape speed and tape running direction, by which the editing point can be easily determined. The play back for an editing point search can be performed with a search button 35R and a search dial 36R. A record button 37 is provided in the R-VTR 1. However, it is not provided in the P-VTR 2.

Further, an editing button 38 for manual editing is arranged for the R-VTR 1.

Next, there will be described the function buttons for editing control.

For editing control, there are provided an assemble button 50, and insert buttons 51V, 51A1 and 51A2 for VIDEO, AUDIO CH-1, AUDIO CH-2 by which forms of editing can be selected. An entry button 52R, an IN-button 53R, an OUT-button 54R, and trim buttons 55+ and 55− are arranged for determining the editing point for the R-VTR 1. Similarly, an entry button 52P, an IN-button 53P, and an OUT-button 54P are arranged for the P-VTR 2. Further, there are arranged a preview button 56, a return/jump button 57, a review button 58, an auto edit button 59, and an end button 60. Reset buttons 61R and 61P are arranged at the side of the displays 21R and 21P for resetting the memories to be hereinafter described.

The editing control apparatus according to this embodiment is controlled by a program with the microprocessor. For facilitating an understanding of the operations of the apparatus, main counters, registers, etc. arranged in the RAM portion of the memory 5, these operations will be described with reference to FIG. 3.

Figure 3:
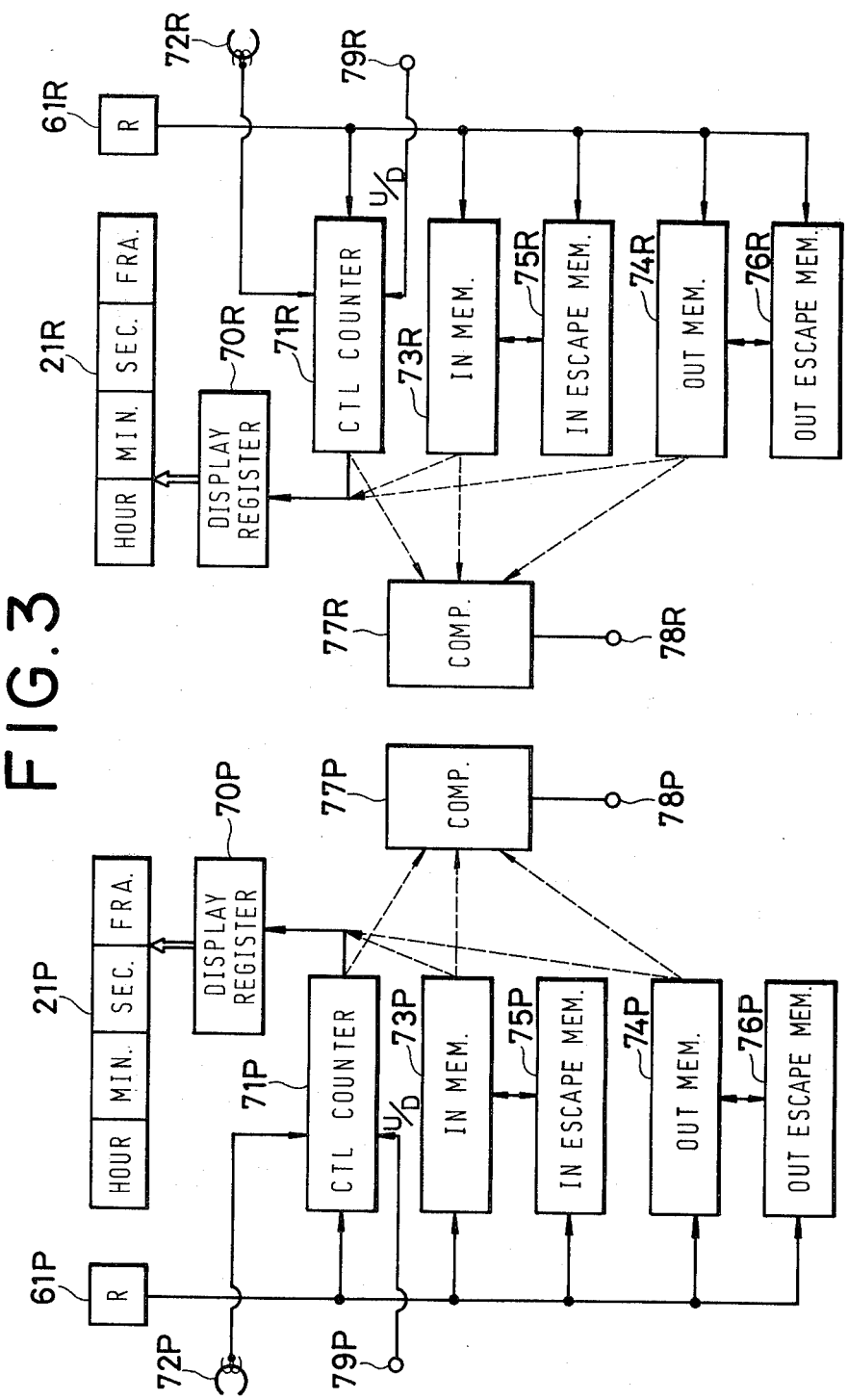
FIG. 3 is a block diagram of circuits arranged in a RAM portion of the memory in FIG. 1.

Referring to FIG. 3, counters, registers, etc. are provided for the R-VTR 1 and P-VTR 2, respectively. A display register 70R is arranged for the display 21R. Another display register 70P is arranged for the display 21P. As above described, in the editing control apparatus, CTL pulses (30 HZ at the normal tape running speed) are used as reference signals, and they are counted by CTL counters 71R and 71P.

The CTL counter 71R for the R-VTR 1 receives CTL pulses reproduced from a CTL head 72R in the R-VTR 1, and it functions as an UP/DOWN counter. The counting direction of the CTL counter 71R is determined by the tape running direction. For that purpose, a tape direction status signal from the R-VTR 1 is supplied through an input terminal 79R to the CTL counter 71R.

Similarly, the CTL counter 71P receives CTL pulses reproduced from a CTL head 72P in the P-VTR 2.

IN memories 73R and 73P and OUT memories 74R and 74P for memorizing edit-in points (IN-points) and edit-out points (OUT-points) are arranged for the R-VTR 1 and P-VTR, respectively. IN escape memories 75R and 75P are provided for the IN memories 76R and 76P are provided for the OUT memories 74R and 74P, respectively.

Further, comparators 77R and 77P are provided for discriminating edit points. Timing signals are obtained from output terminals 78R and 78P of the comparators 77R and 77P in accordance with editing modes. The resist keys 61R and 61P described with reference to FIG. 2 are connected in common with all of the counters and memories for the respective VTRs 1 and 2. The contents of the counters and memories are cleared with the reset keys 61R and 61P.

In the editing control apparatus according to this embodiment, operations for the R-VTR 1 are equal to those for the P-VTR 2. Accordingly, the operations for the P-VTR 2 will be mainly described hereinafter.

First, the assemble button 50 or the insert button 51V are pressed to select the desired editing mode. In the assemble mode, pictures are connected from an edit start point in the record servo condition. In the insert mode, a new picture is inserted into a previously recorded tape in the playback servo condition without erasing the CTL pulses. In FIG. 2, the insert buttons 51A1 and 51A2 are provided for audio signals, and here the description of them will be omitted.

After the assemble button 50 or the insert button 51V is pressed to select the edit mode, the search button 35P is pressed to put the P-VTR 2 into the playback search mode. Then, the edit start point is searched with the search dial 36P. With pressing of the search button 35P, the MPU 4 supplies a search mode command through the VTR interface 3 to the P-VTR 2, and supplies a change-over signal through the VTR interface 3 to the video switcher 10 to supply the reproduced video signals from the P-VTR 2 to the monitor 11P. Accordingly, the pictures from the video tape of the P-VTR 2 are made on the monitor 11P, while the video tape of the P-VTR 2 is transported in the forward and backward directions with the search dial 36P. Normally, the tape is transported by a capstan and a pinch roller in the playback search mode of the VTR. When the tape stops, the tape remains pinched between the capstan and pinch roller. When the capstan and the pinch roller are separated from each other, the tape tension relaxes, and so there is the fear that the determined point will deflect. Accordingly, the edit point should be always determined in the search mode.

In the P-VTR 2, the CTL pulses are reproduced from the tape by the CTL head 72P during the search mode, and they are supplied through the VTR interface 3 and the MPU 4 to the memory 5. They are counted by the CTL counter 71P arranged in the memory 5 under the control of the MPU 4. Then the output of the CTL counter 71P is supplied to the display register 70P. The counted number is converted to hour, minute, second and frame. They are displayed to show the tape position in the display 21P. The determined cut-point or edit point memorized in the IN memory 73P is erased by pressing the reset key 61P. Accordingly, the reset key 61P must not be pressed until a series of the editing operations are finished. When a desired cut-in point or IN-point has been determined, the search dial 36P is returned to the O-position to stop the tape running. Then, the entry button 52P and the IN button 53P are pressed at the same time. The content of the CTL counter 71P is memorized into the IN memory 73P by command of the MPU4. Simultaneously, the memory entry display 22P will stop blinking, and will light up to display that the IN-point has been memorized. Next, a cut-out point or OUT-point is determined in the same manner. Then, the entry button 52P and the OUT button 54P are pressed at the same time to memorize the content of the CTL counter 71P into the OUT memory 74P. The memory entry display 23P will stop blinking, and will light up to display that the OUT-point has been memorized.

In actual operation, the edit-out point only for one of the VTRs 1 and 2 is determined. It is not always required to determine the edit-out points for both of the VTRs.

After the IN-point and the OUT-point are determined and memorized, the auto edit button 59 is pressed to control the editing control apparatus in accordance with the automatic editing program by the MPU 4.

Figure 4:
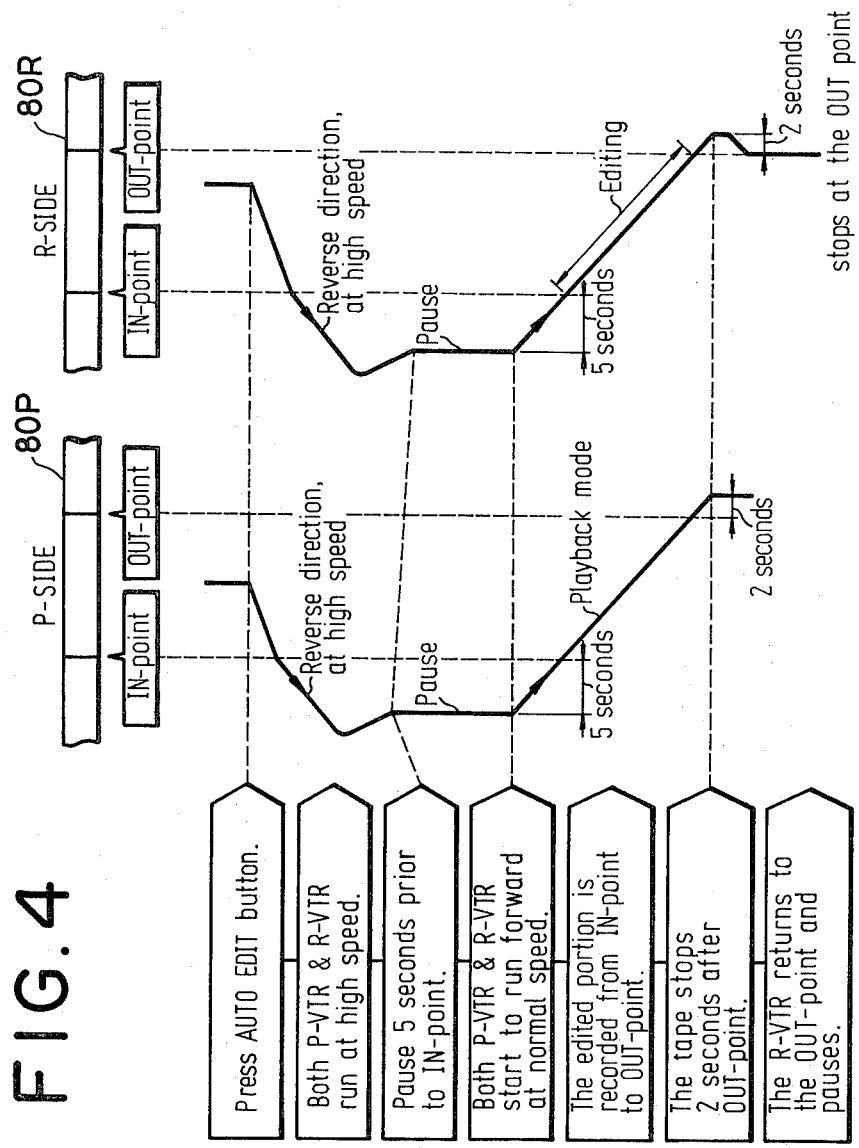
FIG. 4 is a view for explaining operation for automatic editing in the apparatus of FIG. 1, and showing the relationship between time and tape position.

FIG. 4 shows a flow chart of the actual operations including the relationship between the tape positions and time. In FIG. 4 reference numerals 80P and 80R represent tape portions provided in the P-VTR 2 and R-VTR 1, respectively. IN-points and OUT-points are determined for the tape portions 80P and 80R, respectively. In the present editing mode, the video signals recorded in the range of the IN point to the OUT-point of the tape portion 80R in the R-VTR 1 are erased, and the video signals recorded in the range of the IN-point to the OUT-point of the tape portion 80P in the P-VTR 2 are recorded on the erased portion of the tape portion 80R of the R-VTR 1.

When the auto edit button 59 is pressed the video tapes 80P and 80R run at high speed, and pause 5 seconds prior to the IN-points in the VTRs 1 and 2, respectively. Such positions are usually called "preroll points". For determining the preroll points, the contents of the CTL counters 71P and 71R, and the contents of the IN memories 73P and 73R are supplied to the comparators 77P and 77R. When the contents of the CTL counters 71P and 71R reach the values corresponding to [(IN-point) - 5 seconds], stop commands are obtained from the output terminals 78P and 78R of the comparators 77P and 77R. After it is confirmed that the tapes 80P and 80R of the VTRs pause at the preroll points, the tapes 80P and 80R are transported toward the IN-points at the normal speed. When the contents of the counters 71P and 71R become equal to the contents of the IN memories 73P and 73R, editing commands are obtained from the output terminals 78P and 78R of the comparators 77P and 77R. After the edit start point, the R-VTR 1 is put into the recording mode, and the video signals reproduced from the P-VTR 2 are supplied through the video switcher 10 to the R-VTR 1 for recording. Thus, the video signals of the P-VTR 2 are recorded on the video tape 80R of the R-VTR 1. After passing the edit start point, the MPU 4 generates a command to supply the contents of the OUT memories 74P and 74R to the comparators 77P and 77R, respectively. When the contents of the OUT memories 74P and 74R become equal to the contents of the CTL counters 71P and 71R, edit end commands are generated from the output terminals 78P and 78R of the comparators 77P and 77R.

With the edit command, the R-VTR 1 stops recording. The tape 80R stops 2 seconds after the OUT-point, and returns to the OUT-point. Such operations are performed by the command signals obtained from the comparator 77R to which the outputs of the CTL counter 71R and OUT memory 74R are supplied. Also in the P-VTR 2, the tape 80P stops 2 seconds after the OUT-point, and returns to the OUT-point.

Thus, the video signals from the IN-point to the OUT-point of the P-VTR 80P are inserted into the range of the IN-point to the OUT-point of the tape 80R of the R-VTR 1. When the assemble edit mode is selected by the assemble button 50, the R-VTR 1 is so controlled as to stop recording 2 seconds after the OUT-point. When the edit end button 60 is pressed during editing, the VTRs 1 and 2 stop the editing operation, and a compulsory edit-out point is obtained.

In the actual edit operation, it is considerably difficult to determine the edit points. Usually, rehearsal of the edit is performed. The recording operation is not performed. The continuity of the edited video signals is watched by the monitors 11R and 11P. The preview button 56 is provided for such purpose. When the preview button is pressed after determination of the edit points, the series of operations described with reference to FIG. 4 are performed except actual recording operation, of course. For example, the quality of the edit can be monitored on the recorder-side monitor 11R.

Thus the rehearsal is performed by pressing the preview button 56. The edit points are, as occasion demands, altered. Again the edit is previewed. After the edit points are finally determined, the auto edit button 59 is pressed to perform the actual edit operation. Such a procedure is usual for the edit operation.

When the actual edit is finished, the contents of the IN memories 73R and 73P, and of the OUT memories 74R and 74P are removed into the IN escape memories 75R and 75P, and the OUT escape memories 76R and 76P, respectively. The memory entry displays 22R, 22P, 23R and 23P will stop lighting up, and will blink. When the edit end button is pressed during the insert edit mode, or during the preview mode, the contents of the CTL counters 71P and 71R at that time are memorized as the OUT-points into the OUT memories 74P and 74R.

When the result of the edit will be checked, the review button 59 is pressed. The operations here after are performed only for the R-VTR 1.

First, the contents of the IN escape memory 75R and of OUT escape memory 76R are returned to the IN memory 73 and OUT memory 74R. The tape runs in the same manner as in the preview mode. The video signals on the video tape 80R of the R-VTR, 5 seconds prior to the IN-point to 2 seconds after the OUT-point, are reproduced. Thus, the result of the edit can be checked at once.

When the review operation is finished, the contents of the OUT memory 74R and IN memory 73R are removed into the OUT escape memory 76R and IN escape memory 75R. When the preview button 56 or the auto edit button 59 is pressed such that the displays 22R and 22P for the IN memories 73R and 73P are blinking, or that the IN-points are not yet determined, or after the auto edit operation or the review operation ends, the contents of the CTL counters 71R and 71P at that time are memorized into the IN memories 73R and 73P, and the preview mode or auto edit mode starts.

The display registers 70R and 70P normally receive the contents of the CTL counters 71R and 71P. However, when only the IN buttons 53R and 53P are pressed, the contents of the IN memories 73R and 73P or of the IN escape memories 75R and 75P which are removed to the IN memories 73R and 73P, are supplied to the display registers 70R and 70P. When only the OUT buttons 54R and 54P are pressed, the similar operations are performed with respect to the edit OUT point. The trim buttons 55+ and 55− become effective only when the IN button or OUT button are pressed at the same time. For example, when the IN button 53P is pressed, the content of the IN memory 73P is displayed in the display 21P, through the display register 70P, as above described. When the trim button 55+ is pressed in such condition, the number of frames corresponding to the number of the pressing operations is added to the content of the IN memory 73P. When the trim button 55− is pressed, it is subtracted from the content of the IN memory 73P. Thus, the frame number of the edit point can be altered.

The above-described operations are usual. Next, features of the editing control apparatus according to this embodiment of the invention will be described in order.

One of the features is a warning operation for showing setting error of edit point. The relationship between the IN-point and OUT-point should be as follows:

IN-point < OUT-point where the IN-point and OUT-point represent the corresponding counted numbers of the CTL counter. When the edit points are erroneously set as IN-point ≧ OUT-point, the auto editing operation or preview operation is not performed, and the entry displays 22R and 23R alternately blink to display setting error.

Figure 5:
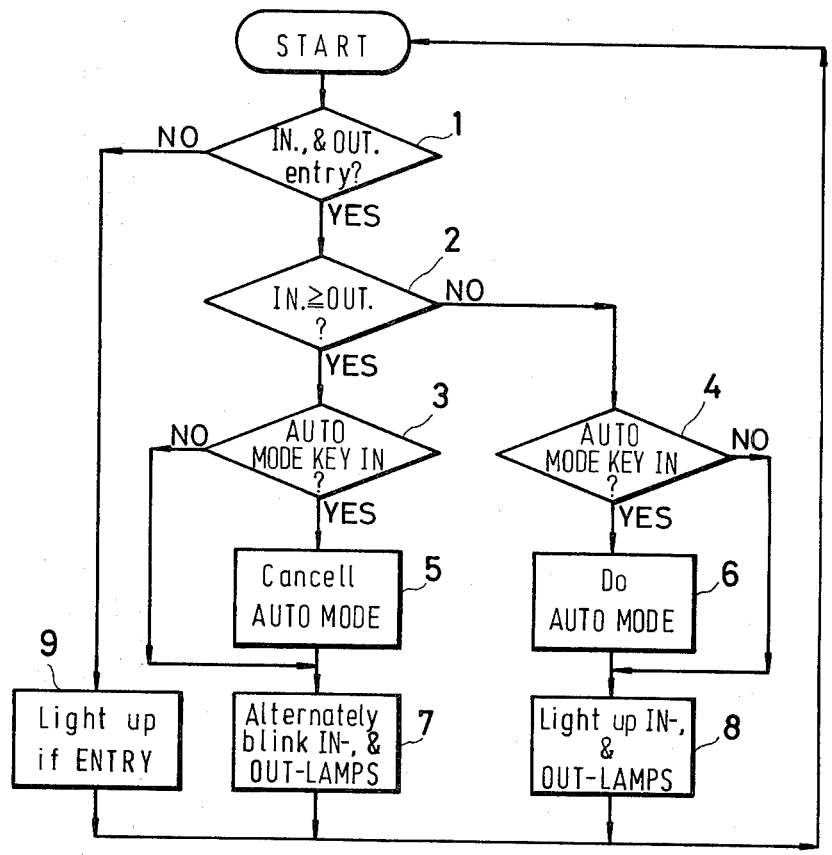
FIG. 5 is a flow chart for explaining an operation for displaying an error at an editing point in the apparatus of FIG. 1.

Such operations will be described with reference to the flow chart of FIG. 5. First, it is checked whether both the IN-point and the OUT-point are determined or not at step 1, following the program start. When both of the IN-point and OUT-point are determined, it is checked whether IN-point ≧ OUT-point or not, at step 2. If IN-point < OUT-point, it is discriminated whether the auto edit button 59 or the preview button 56 is pressed or not, at step 4. When the button 59 or 56 is pressed, the corresponding mode is performed, at step 6. The entry displays 22R and 23R light up. The flow returns to "START" from the step 8.

If IN-point ≧ OUT-point, the auto mode obtained by pressing the auto edit button 59 or preview button 56 is cancelled at step 5, and the entry displays 22R and 23R alternately blink at step 7. For discrimination of the step 2, the contents of the IN memory 73R and OUT memory 74R are supplied to the comparator 77R. The entry display 22R or 23R for which the edit point is determined, lights up at step 9.

Next, there will be described a return function which is another of the features of this embodiment.

This function is obtained by pressing the return/jump button 57 after the tape passes the IN point in the preview mode obtained by pressing the preview button 56. Then, the preview operation is ceased. Both of the tapes 80P and 80R of the P-VTR 2 and R-VTR 1 are rewound at high speed, and stop at the IN points. When the tape 80P passes the IN-point in the preview mode, the contents of the CTL counter 71P and OUT memory 74P are supplied to the comparator 77P. However, the comparator 77P is changed over from the output of the OUT memory 74P into the output of the IN memory 73P by pressing the return/jump button 57. When the return/jump button 57 is pressed at the end of the auto edit, the data stored in the IN escape memory 75P and OUT escape memory 76P are, as above described, returned to the IN memory 73P and OUT memory 74P, and the tapes 80R and 80P of the R-VTR 1 and P-VTR 2 are stopped at the IN-points.

Figure 6:
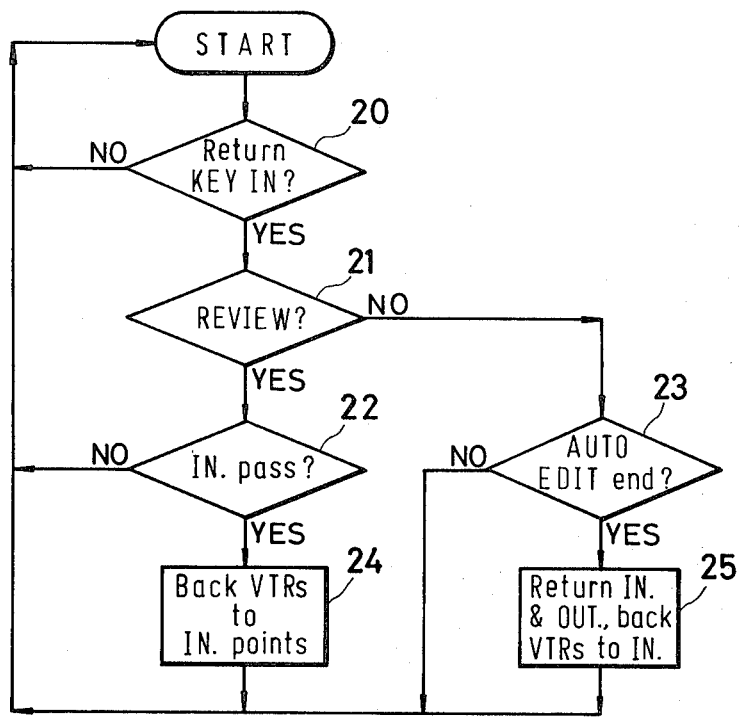
FIG. 6 is a flow chart for explaining a return function in the apparatus of FIG. 1.

The flow chart of FIG. 6 shows the above described return function. Folllowing "START", it is discriminated whether the return/jump button 57 is pressed or not at step 20. It is discriminated whether the VTR is in the preview mode or in the auto edit end, at steps 21 and 23. In the preview mode, it is discriminated whether the tape of the VTR passes over the IN-point or not at step 22. If it passes over the IN-point, the VTRs are returned to the IN-points at high speed at step 24. If the VTR is in the auto edit end, the contents of the IN and OUT escape memories are returned to the IN and OUT memories, and the VTRs are returned to the IN-points, at step 25.

Since the apparatus of this embodiment has the above described return function, it is not required to search the cut-in point with the search dial, for example, in the case that the edit start point is confirmed in the preview operation, or that the edit start point is altered after the confirmation of the edit start point. Furthermore, when the edit is performed over again after the end of the auto edit, the apparatus of this embodiment is easy to operate.

Next, there will be described a jump function which is a further one of the features of this embodiment.

The jump junction is used for checking the OUT-point after performing the edit. The review mode starts with pressing of the review button 58. After video tape 80R of the R-VTR 1 passes the IN-point, the return/jump button 57 is pressed. The tape 80R is transported to the position corresponding to 5 seconds prior to the OUT-point, at high speed. At that time, the contents of the OUT memory 74R and CTL counter 71R are supplied to the comparator 77R, and they are compared with each other there to search the cut-out (OUT-point). The picture portions 5 seconds prior to the OUT-point to 2 seconds after that point are reproduced. Then, the tape returns to the OUT-point and stops.

FIG. 7 is a flow chart showing the above-described jump function. Thus, when only the edit-in point (IN-point) and the edit-out point (OUT-point) necessary to be checked, the OUT-point can be easily searched only by the return/jump button 57 after confirming the IN-point. Even when the distance between the IN-point and the OUT-point is very long, the OUT-point can be searched in short time.

As above described, the tapes are always pinched between the capstan and the pinch roller in the VTRs 1 and 2 to prevent the edit points from deflecting. The tapes are held in tension on the head cylinder including the rotary magnetic head. However, when a pre-determined time (for example, 7 minutes) lapses after the tape stops, the pinch roller and the capstan are automatically separated from each other to release the tape tension. Thus, the tape is prevented from being damaged. Such an operation is called "auto-shut-off operation". However, the auto-shut-off function is undesired for the edit control apparatus, since the edit point is deflected. Accordingly, the auto-shut-off function will not work in the edit control apparatus of this embodiment as explained hereafter.

When the time to determine the edit point in the P-VTR 2 becomes longer than 6 minutes when the R-VTR 1 stops, a minimum running command is supplied to the R-VTR 1 to avoid the auto-shut-off function. Thus, the edit point is prevented from deflecting. Such function is one of the features of the editing control apparatus of this embodiment.

The above-described function is shown in the flow chart of FIG. 8. Following "START", it is discriminated whether the VTRs 1 and 2 pause or not, at step 30. Then it is determined whether the edit point is memorized in the IN memory or OUT memory or not, at step 31. If the VTR is not in the pause, or if the edit point has not yet been determined, a 6-minute timer is reset, at step 34. The 6-minute timer counts software interrupting operations to the MPU 4. For that purpose, the pulses from the frequency divider 15 are supplied to the MPU 4. If the VTRs are in a pause function, and the edit points are determined, it is confirmed that the timer by the interrupting operation has measured longer than 6 minutes, at step 32. Then, the minimum speed running command is supplied to the corresponding VTR, at step 33. Thus, the edit point is prevented from deflecting due to the auto-shut-off mechanism provided in the VTR itself.

Although the illustrative embodiment of the invention has been described in detail herein with reference to the accompanying drawings, it is to be understood that the invention is not limited to the precise embodiment, and that various changes and modifications can be effected therein by one skilled in the art wihout departing from the scope and spirit of the invention as defined in the appended claims.

We claim as our invention:

1. An editing control apparatus for video tape recorders, comprising:
(A) means for sensing positions of video tapes installed in a recorder-VTR and a player VTR, respectively;
(B) means for memorizing data for positions of the video tapes obtained at said position sensing means;
(C) means for advancing video tapes of the recorder and player VTRs in synchronism to each other with reference to the memorized data for the respective video tapes;
(D) means for executing editing operations by recording video signals reproduced by said player-VTR on video tapes of said recorder-VTR from tape positions memorized in said data memorizing means;
(E) means for interrupting said video tape advancing operation by manually operating switching means;
(F) means for positioning respective video tapes to positions referenced by memorized data in said data memorizing means automatically and without manual intervention immediately after said interrupting means is actuated; and
(G) when said means for interrupting is actuated, said means for positioning including means for automatically moving the video tape of the recorder-VTR at high speed relative to normal playback speed to a predetermined position prior to a memorized position and means for then automatically advancing without further manual intervention the recorder-VTR video tape at the normal playback speed from said predetermined position to said memorized position.

2. An editing control apparatus for video tape recorders as claimed in claim 1, further comprising:
means for executing editing operations by recording video signals reproduced by said player-VTR on video tapes of said recorder-VTR from tape positions memorized in said data memorizing means, and
means for previewing an editing operation for a rehearsal purpose on a monitor screen, said interrupting means being operative after said memorized tape position has passed during said preview operation, and the respective tapes are automatically rewound to the memorized tape positions.

3. An editing control apparatus as claimed in claim 1, further comprising:
means for executing editing operations by recording video signals reproduced by said player-VTR on video tapes of said recorder-VTR from tape positions memorized in said data memorizing means, and
means for reviewing an editing program for confirmation purposes on a monitor screen by advancing said recorder-VTR, said memorized data including an edit-in point and an edit-out point, said interrupting means being operative after said edit-in point has passed during said review operation, and the video tape of the recorder-VTR being fast-forwarded to a position shortly before said edit-out point immediately after said interrupting means is actuated.

4. An editing control apparatus as claimed in claim 1, wherein said data memorizing means includes edit-point memory means and escape memory means associated with respective edit point memory means, and when the video tape is advanced across said memorized tape position, the data in said edit point memory means are reserved in said escape memory means.

5. An editing control apparatus as claimed in claim 4, wherein when said interrupting means is actuated, said escape memory means feeds back reserved data therein to said edit point memory means.

* * * * *